United States Patent
Chen et al.

(10) Patent No.: US 9,527,733 B2
(45) Date of Patent: Dec. 27, 2016

(54) METHOD AND APPARATUS FOR DYNAMIC-TUNING

(71) Applicant: The Chinese University of Hong Kong, Hong Kong (CN)

(72) Inventors: Shih-Chi Chen, Hong Kong (CN); Chenglin Li, Hong Kong (CN); Ji Wang, Hong Kong (CN)

(73) Assignee: THE CHINESE UNIVERSITY OF HONG KONG, Hong Kong (CN)

( * ) Notice: Subject to any disclaimer, the term of this patent is extended or adjusted under 35 U.S.C. 154(b) by 33 days.

(21) Appl. No.: 14/535,611

(22) Filed: Nov. 7, 2014

(65) Prior Publication Data

US 2016/0133822 A1 May 12, 2016

(51) Int. Cl.
*H01L 41/09* (2006.01)
*B82Y 40/00* (2011.01)
*H02N 2/00* (2006.01)
*H02N 2/02* (2006.01)

(52) U.S. Cl.
CPC ............. *B82Y 40/00* (2013.01); *H02N 2/0095* (2013.01); *H02N 2/028* (2013.01)

(58) Field of Classification Search
USPC .......... 310/311, 323.01, 323.02, 323.17, 328
See application file for complete search history.

(56) References Cited

U.S. PATENT DOCUMENTS

| | | | |
|---|---|---|---|
| 4,733,561 A | 3/1988 | Gilby | |
| 4,901,586 A | 2/1990 | Blake et al. | |
| 4,912,990 A | 4/1990 | Norling | |
| 5,695,027 A | 12/1997 | Von Flotow et al. | |
| 6,555,829 B1 * | 4/2003 | Spallas et al. | 250/492.2 |
| 7,677,105 B2 | 3/2010 | Ishii | |
| 7,884,526 B2 * | 2/2011 | Suzuki | 310/309 |
| 7,893,642 B2 * | 2/2011 | Suzuki | 318/560 |
| 8,089,053 B1 * | 1/2012 | Finch | 250/440.11 |
| 2002/0074897 A1 * | 6/2002 | Ma et al. | 310/311 |
| 2004/0016307 A1 | 1/2004 | Albert | |
| 2005/0040730 A1 * | 2/2005 | Baeck et al. | 310/309 |
| 2007/0214890 A1 | 9/2007 | Mukherjee | |
| 2010/0102675 A1 * | 4/2010 | Suzuki | 310/323.02 |
| 2010/0102676 A1 * | 4/2010 | Suzuki | 310/323.02 |
| 2010/0109476 A1 * | 5/2010 | Suzuki | 310/323.02 |
| 2010/0109478 A1 * | 5/2010 | Suzuki | 310/328 |
| 2010/0109479 A1 * | 5/2010 | Suzuki | 310/328 |

(Continued)

OTHER PUBLICATIONS

Shaker, Francis J. "Effect of axial load on mode shapes and frequencies of beams", National Aeronautics and Space Administration (1975).

(Continued)

*Primary Examiner* — Thomas Dougherty
(74) *Attorney, Agent, or Firm* — Knobbe Martens Olson & Bear LLP (57) ABSTRACT

A compliant apparatus for nano-manufacture, including a stage for supporting the objects to be nano-manufactured. The stage includes at least one flexural beam and at least one actuator coupled to the flexural beam; and the actuator is configured to generate and apply axial loads onto the flexural beam, such that a natural frequency of the flexural beam is shifted in response to the generated axial loads, so as to allow trade-offs between the natural frequency and a stroke of the stage for nano-manufacturing the objects.

12 Claims, 5 Drawing Sheets

(56) References Cited

U.S. PATENT DOCUMENTS

2010/0117487 A1* 5/2010 Suzuki .................. 310/328
2010/0148631 A1* 6/2010 Szuki .................. 310/323.17
2011/0048133 A1 3/2011 Lin et al.
2011/0074247 A1 3/2011 Hohlfeld et al.
2013/0321892 A1 12/2013 Haeberle et al.

OTHER PUBLICATIONS

Kim, Si-Young, "Design, fabrication and static test of a resonant microaccelerometer", thesis submitted to the facility of the Korea Advanced Institute of Science and Technology, dated Dec. 17, 1997.

Syms, Richard R. A. "Electrothermal frequency tuning of folded and coupled vibrating micromechanical resonators." Journal of Microelectromechanical Systems, 7:(2) (1998), pp. 164-171.

Irvine, Tom. "Natural Frequencies of Beams Subjected to a Uniform Axial Load." Revision A, Vibrationdata (2003).

Leland, Eli S., et al., "Resonance tuning of piezoelectric vibration energy scavenging generators using compressive axial preload." Smart Materials and Structures 15 (2006), pp. 1413-1420.

Zhu, Dibin, et al. "Design and experimental characterization of a tunable vibration-based electromagnetic micro-generator." Sensors and Actuators A, 158 (2010), pp. 284-293.

Mansour, Mohamed et al.. "Resonator with magnetically adjustable natural frequency for vibration energy harvesting." Sensors and Actuators A, 163 (2010), pp. 297-303.

C. Li, Jet et al., "Design of a Flexure-based Dynamic-tunable Five-axis Nanopositioner," Proceedings of the Annual Meeting of the ASPE, Boston, MA, Nov. 2014, pp. 153-157.

* cited by examiner

METHOD AND APPARATUS FOR DYNAMIC-TUNING

TECHNICAL FIELD

Embodiments of the present application relate generally to a compliant apparatus and, in particular, a compliant apparatus which enables a nano-positioner for nano-manufacturing to be dynamically tuned.

BACKGROUND

Nano-positioners may be used to move objects of different sizes with a nanometer-level or a better precision. The nano-positioners are important as they set limits on an ability to measure, understand, manipulate, and manufacture physical systems. Compliant apparatus, i.e. flexures, are ideal for the ultra-precision motion guidance and possess advantages (no wear between joint members and free of backlash etc.) over traditional mechanical linkages in precision motion applications. However, there is a limitation for flexure-based nano-positioners, that is, high-bandwidth flexure-guided nano-positioners have a relatively small travel range, while large-displacement flexure-based nano-positioners have low natural frequencies, e.g. the resonant frequency of a millimeter-ranged nano-positioner is less than 100 Hz.

SUMMARY

In one aspect of the present application, there is disclosed a compliant apparatus to enable a nano-positioner for nano-manufacturing to be dynamically tuned. The compliant apparatus for nano-manufacture may comprise a stage for supporting the objects to be nano-manufactured. The stage may comprise at least one flexural beam and at least one actuator coupled to the flexural beam. The at least one actuator is configured to generate and apply axial loads onto the flexural beam, such that a natural frequency of the flexural beam is shifted in response to the generated axial loads, so as to allow trade-offs between the natural frequency and a stroke of the stage for nano-manufacturing the objects.

In another aspect of the present application, there is also disclosed a compliant apparatus with a stage. The stage of the compliant apparatus may further comprise at least one additional beam in which the actuator is arranged. The actuator is configured to generate axial loads and to apply the generated axial loads onto the additional beam, and a flexural beam is configured to receive the generated axial loads from the additional beam, such that a natural frequency of the flexural beam is shifted in response to the generated axial loads, allowing trade-offs between the natural frequency and the stroke of the stage for nano-manufacturing the objects.

The natural frequency of the second beam applied with an axial load may be determined based on a stress-stiffening effect of the flexural beam.

The actuator may be configured to generate the axial loads according to a required stroke of the nano-manufacturing for the objects so as to change the natural frequency.

In one embodiment of the present application, there is disclosed a compliant apparatus. At least one flexural beam of the compliant apparatus may comprise a first beam and a second beam, and at least one actuator of the compliant apparatus may comprise a first actuator and a second actuator. The first actuator is arranged on the first beam, and the second actuator is arranged on the second beam. The first actuator is configured to generate and apply an axial load to the first beam, so as to allow trade-offs between the natural frequency and the stroke in an axial direction of the first beam. The second actuator is configured to generate and apply an axial load to the second beam, so as to allow trade-offs between the natural frequency and the stroke in an axial direction of the second beam. The axial directions of the first and the second beams may intersect from each other.

In one embodiment of the present application, there is disclosed a compliant apparatus. At least one flexural beam of the compliant apparatus may comprise a first beam, a second beam and a third beam, and the at least one actuator may comprise a first actuator, a second actuator and a third actuator. The first actuator is arranged on the first beam, the second actuator is arranged on the second beam, and the third actuator is arranged on the third beam. The first actuator is configured to generate and apply an axial load to the first beam, so as to allow trade-offs between the natural frequency and the stroke in an axial direction of the first beam. The second actuator is configured to generate and apply an axial load to the second beam, so as to allow trade-offs between the natural frequency and the stroke in an axial direction of the second beam. The third actuator is configured to generate and apply an axial load to the third beam, so as to allow trade-offs between the natural frequency and the stroke in an axial direction of the third beam. The axial directions of the first, the second and the third beams may intersect from each other.

In one embodiment of the present application, there is disclosed a compliant apparatus. The compliant apparatus may further comprise at least one additional beam in which the actuator is arranged. The at least one additional beam may comprise a first thick beam and a second thick beam. The at least one flexural beam may comprise a first flexural beam and a second flexural beam. The least one actuator may comprise a first actuator and a second actuator. The first actuator is arranged on the first thick beam and the second actuator is arranged on the second thick beam. The first thick beam and the first flexural beam form a first compliant assembly, and the second thick beam and the second flexural beam form a second compliant assembly. The first actuator is configured to generate and apply an axial load to the first compliant assembly, so as to allow trade-offs between the natural frequency of the first compliant assembly and the stroke in an axial direction of the first compliant assembly. The second actuator is configured to generate and apply an axial load to the second compliant assembly, so as to allow trade-offs between the natural frequency of the second compliant assembly and the stroke in an axial direction of the second compliant assembly. The axial directions of the first and the second compliant assemblies intersect from each other.

In one embodiment of the present application, there is disclosed a compliant apparatus. The compliant apparatus may further comprise at least one additional beam in which the actuator is arranged. The at least one additional beam may comprise a first thick beam, a second thick beam and a third thick beam. The at least one flexural beam may comprise a first flexural beam, a second flexural beam and a third flexural beam. The least one actuator may comprise a first actuator, a second actuator and a third actuator. The first actuator is arranged on the first thick beam, the second actuator is arranged on the second thick beam and the third actuator is arranged on the third thick beam. The first thick beam and the first flexural beam form a first compliant assembly, the second thick beam and the second flexural beam form a second compliant assembly and the third thick beam and the third flexural beam form a third compliant assembly. The first actuator is configured to generate and apply an axial load to the first compliant assembly, so as to allow trade-offs between the natural frequency of the first compliant assembly and the stroke in an axial direction of the first compliant assembly. The second actuator is configured to generate and apply an axial load to the second compliant assembly, so as to allow trade-offs between the natural frequency of the second compliant assembly and the stroke in an axial direction of the second compliant assembly. The third actuator is configured to generate and apply an axial load to the third compliant assembly, so as to allow trade-offs between the natural frequency of the third compliant assembly and the stroke in an axial direction of the third compliant assembly. The axial directions of the first, the second and the third compliant assemblies intersect from each other.

In one embodiment of the present application, there is disclosed a method for dynamic-tuning for a compliant apparatus. In the method, the compliant apparatus may comprise a stage for supporting the objects to be nano-manufactured and the stage comprises at least one flexural beam. The method may comprise a step of coupling at least one actuator to the flexural beam; and a step of configuring the actuator to generate and apply axial loads onto the flexural beam, such that a natural frequency of the flexural beam is shifted in response to the generated axial loads to allow trade-offs between the natural frequency and a stroke of the stage for nano-manufacturing the objects.

Various advantages, aspects and novel features of the present application, as well as details of an illustrated embodiment thereof, will be more fully understood from the following description and drawings.

BRIEF DESCRIPTION OF THE DRAWINGS

In order to make the above recited features of the present application understood in detail, a more particular description of the application will be discussed in reference to embodiments, some of which are illustrated in the appended drawings. It is to be noted, however, that the appended drawings illustrate only typical embodiments of this application and are therefore not to be considered limiting of its scope.

In addition, in the drawings, the size of the elements may be exaggerated for clarity. Like numbers refer to like elements throughout the specification.

DETAILED DESCRIPTION OF THE PREFERRED EMBODIMENTS

Exemplary embodiments of the present application provide a method and a compliant apparatus that enable the nano-positioner to have a real-time dynamic-tuning capability.

Exemplary embodiments of the present application will now be described in detail with reference to the attached drawings. Exemplary embodiments of the present application may be modified in many different forms, and should not be construed as being limited to exemplary embodiments set forth herein.

As used herein, the singular forms, "a", "an" and "the" are intended to include the plural forms as well, unless the context clearly indicates otherwise.

According to the embodiments of the present application, there is disclosed a compliant apparatus, as a part of a nano-positioner for nano-manufacturing, configured to dynamically tune the nano-positioner in accordance with an embodiment of the present application. The compliant apparatus may comprise a stage for supporting the objects to be nano-manufactured. The stage may comprise at least one flexural beam and at least one actuator coupled to the flexural beam. The flexural beam may be configured with at least one actuator to generate and apply axial loads onto the flexural beam, such that a natural frequency of the flexural beam is shifted in response to the generated axial loads to allow trade-offs between the natural frequency and a stroke of the stage for nano-manufacturing the objects.

Figure 1:
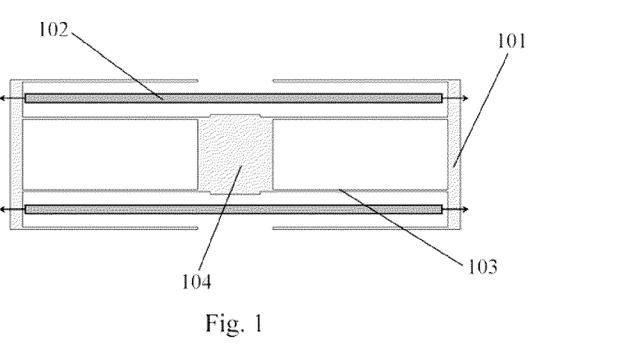
FIG. 1 is a diagram illustrating a compliant apparatus according to an exemplary embodiment of the present application.

According to the present application, the at least one actuator may be piezoelectric actuator. Where the actuator is bulky and heavy, there may be at least one additional beam to support the actuator. FIG. 1 illustrates a compliant apparatus 100, as a part of a nano-positioner for nano-manufacturing, configured to dynamically tune the nano-positioner in accordance with an embodiment of the present application, in which the additional beam is arranged to support the actuator. As shown in FIG. 1, the compliant apparatus 100 may comprise a stage 104 for supporting the objects to be nano-manufactured. The stage 104 may comprise at least one first beam 101, and at least one actuator 102 arranged on the first beam 101, and at least one second beam 103. In one embodiment of the present application, the first beam 101 is relatively thick compared with the second beam 103, and the second beam 103 may be flexural. For example, the flexural beam 103 means those very thin beams but not those relatively thick beams. The actuator 102 is configured to generate and apply axial loads onto the thick beam 101. The flexural/thin beam 103 generates a precise motion thereof for the nano-manufacturing process. The thick beam 101 holds the stiffness-tuning actuators 102 and transmits axial loads to flexural/thin beam 103. Although the actuators 102 and thick beams 101 are in contact with each other, the actuators 102 may apply axial loads onto the flexural beams to stiffen the flexure, such that a natural frequency of the flexural beam 103 will be shifted in response to the axial loads generated by the actuator 102, so as to allow trade-offs between the natural frequency and the stroke of nano-manufacturing for the objects to be manufactured by the apparatus 100.

In one embodiment of the application, the actuator 102 generates the axial loads according to a required stroke of the compliant apparatus, and thus to change the natural frequency of the flexural beam 101.

It is known that the dynamic performance of a flexural apparatus depends on its natural frequency; however, this is often compromised by a required stroke of the apparatus 100. In other words, a high natural frequency can only be achieved at the expense of reduced stroke. A dynamic-tunable flexure-based nano-positioner as discussed allows trade-offs between its speed (natural frequency) and range (stroke)—a concept inspired by compliant actuators used in humanoid robots. That is, the axial force N is adjusted according to the required stroke of the apparatus, and thus to change the natural frequency ω.

In the present application, the dynamic-tuning effect is achieved by exploiting the "stress-stiffening effect", i.e. the stiffness of a beam increases when it experiences tensile loads in the axial direction. The natural frequency of a simply supported beam with axial force N may be described by Equation (1), $$\omega = \left(\frac{\pi}{l}\right)^2 \sqrt{\frac{EI}{\rho A}} \sqrt{1 + \frac{Nl^2}{\pi^2 EI}} \qquad (1)$$

where ω is the natural frequency; l, A, I, E, ρ is the length, cross section area, moment of inertia, Young's modulus, density of the beam, respectively.

For example, the natural frequency of a 70 mm long and 1 mm thick titanium beam may be shifted from, for example, 450 Hz to 1,164 Hz when 1,000N tensile force is applied. It shall be appreciated that the compression load is not used as it may cause buckling and instability.

Figure 2A:
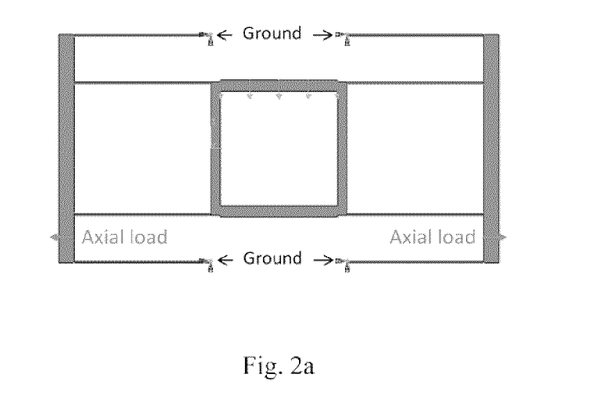
FIGS. 2a and 2b are diagrams illustrating the simulated results of a symmetric DP apparatus with increasing axial loads until the yield stress is reached.
Figure 2B:
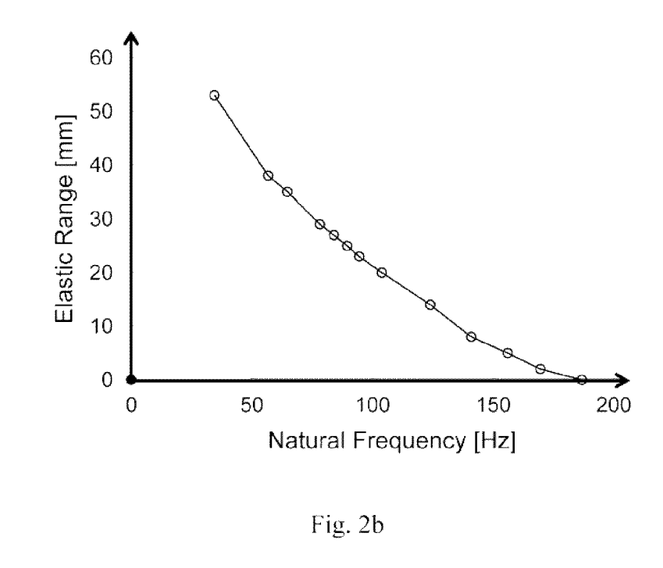

FIGS. 2a and 2b present the simulated results of a symmetric double parallelogram (DP) apparatus with increasing axial loads until the yield stress is reached, in which the FIG. 2a shows a CAD model of the simulated results. The material used in the FEA (Finite Element Analysis) simulation is titanium.

Figure 3:
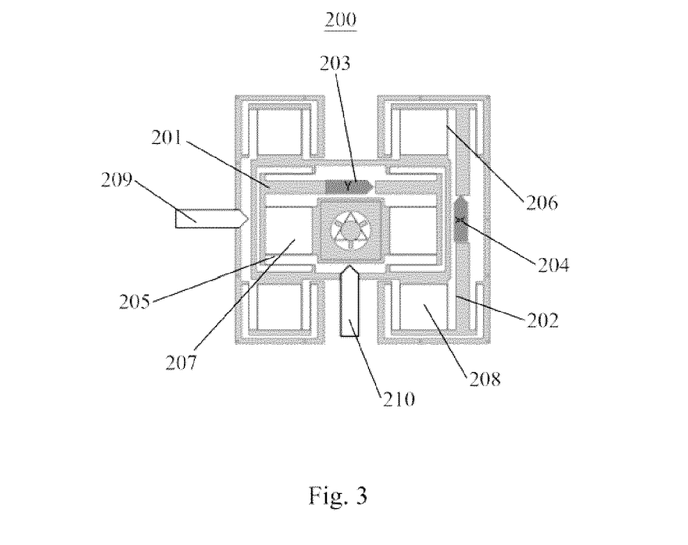
FIG. 3 is a diagram illustrating an apparatus with a X-Y stage according to an exemplary embodiment of the present application.

FIG. 3 illustrates an apparatus 200 with a X-Y stage in accordance with an embodiment of the present application. As shown in FIG. 3, the X-Y stage may comprise a first thick beam 201 configured with a first actuator 203 and a second thick beam 202 configured with a second actuator 204. The apparatus 200 may also comprises a first flexural beam 205 and a second flexural beam 206. The first thick beam 201 and the first flexural beam 205 form a first compliant assembly 207, and the second thick beam 202 and the second flexural beam 206 form a second compliant assembly 208. The first and the second compliant assemblies 207, 208 consist of the X-Y stage to decouple a X-axial direction motion and a Y-axial direction motion of one or more objects to be moved. The first actuator 203 generates and applies a axial load, for example, in X-radial direction, to the first compliant assembly 207 to allow trade-offs between the natural frequency and the stroke in a X-axial direction; and the second actuator 204 generates and applies an axial load, for example, in X-radial direction, to the second compliant assembly 208 to allow trade-offs between the natural frequency and the stroke in a Y-axial direction. The axial directions of the first and the second compliant assemblies (207, 208) may intersect from each other.

Returning to FIG. 3, the apparatus 200 may further comprise two drivers 209 and 210 for the first and the second compliant assemblies 207, 208, respectively, and each of the drivers is configured to move the stage in at least one direction.

The actuator in the embodiment of the present application may comprise piezoelectric actuator or manual extensible equipment.

The design of the X-Y stage utilizes the principle of constraint-based design by using multiple folded-beam apparatus to decouple the X and the Y motion. The extended range in the X and Y directions are achieved by the symmetric double parallelogram (DP) apparatus. To implement dynamic-tuning, the first and second actuators 203, 204, such as piezoelectric actuators, are used in each DP apparatus to generate axial loads (stress) for dynamic-tuning. The dynamic-tuning apparatus is implemented on the X-Y stage to enable trade-offs between its range and speed.

The X-Y stage provides a decoupled motion guidance capability in two independent axes (X and Y). This is achieved through the unique arrangement of the folded beam flexure design that minimizes cross-axis coupling of error motions.

Figure 4:
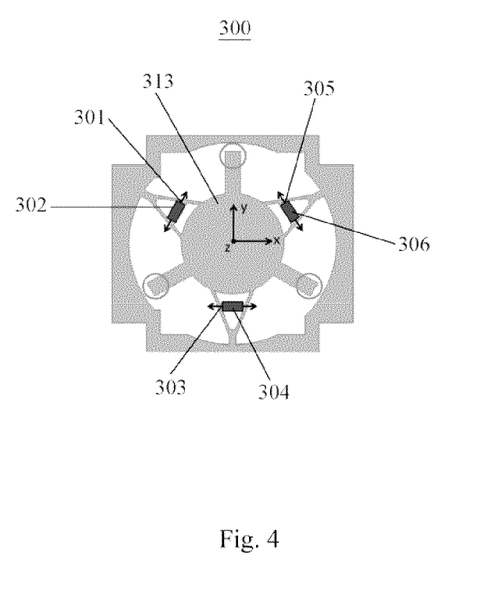
FIG. 4 is a diagram illustrating a apparatus with a Z-$\theta_X$-$\theta_Y$ stage according to an exemplary embodiment of the present application.

FIG. 4 illustrates an apparatus 300 with a Z-$\theta_X$-$\theta_Y$ stage 313 in accordance with an embodiment of the present application. As shown in FIG. 4, the apparatus 300 may comprise a first flexural beam 301 configured with a first actuator 302, a second flexural beam 303 configured with a second actuator 304 and a third flexural beam 305 configured with a third actuator 306.

As shown in FIG. 4, the Z-$\theta_X$-$\theta_Y$ stage 313 may generate independent motions in the Z, $\theta_X$, and $\theta_Y$ directions of one or more objects to be moved. The first actuator 302 generates and applies an axial load to the first flexural beam 301 to allow trade-offs between the natural frequency and the stroke in an axial direction of the first flexural beam 301. The second actuator 304 generates and applies an axial load to the second flexural beam 303 to allow trade-offs between the natural frequency and the stroke in an axial direction of the second flexural beam 303. The third actuator 306 generates and applies an axial load to the third flexural beam 305 to allow trade-offs between the natural frequency and the stroke in an axial direction of the third flexural beam 305. The axial loads are generated based on a stress-stiffening effect of the flexural beams according to required strokes of the compliant apparatus, and thus to change their natural frequencies, respectively. The axial directions of the first, the second and the third flexural beams may intersect from each other.

Figure 5:
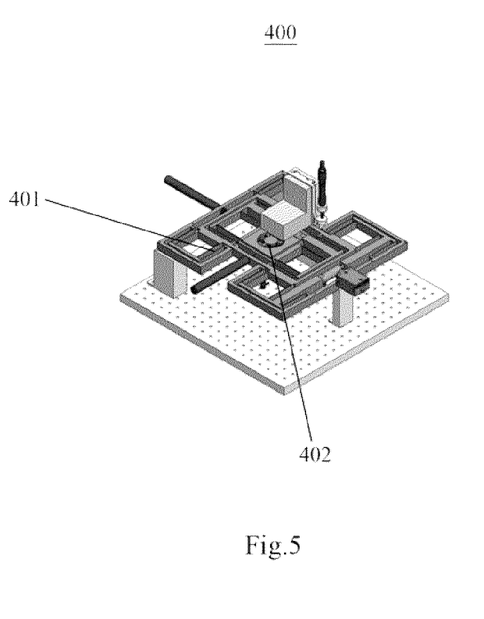
FIG. 5 is an isometric view illustrating a layout of a nano-positioner with a compliant apparatus according to an exemplary embodiment of the present application.

FIG. 5 shows the layout of a flexure-based five-axis nano-positioner 400 with dynamic-tuning capability in accordance with an embodiment of the present application, where an in-plane X-Y stage 401 and an out-of-plane Z-$\theta_X$-$\theta_Y$ stage 402 are connected in series to achieve five degrees of freedom. The design of the X-Y stage 401 is similar to that of the embodiment shown in FIG. 3, and the design of the Z-$\theta_X$-$\theta_Y$ stage 402 is similar to that of the embodiment shown in FIG. 4.

Figure 6:
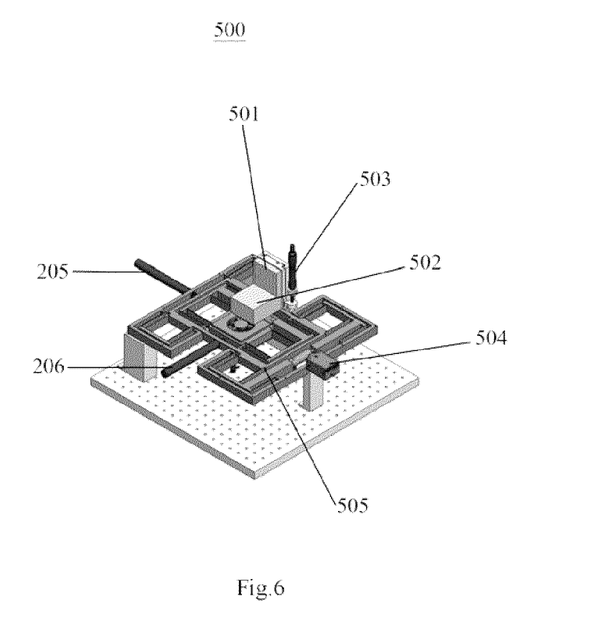
FIG. 6 is an isometric view illustrating a layout of a nano-manufacturing station that includes the five-axis nano-positioner shown in FIG. 4 according to an exemplary embodiment of the present application.

In a further aspect of the present application, there is also provided a parallel nano-manufacturing station 500. FIG. 6 illustrates the conceptual design of a nano-manufacturing station 500 that includes the five-axis nano-positioner 400 (as shown in FIG. 4) integrated with a custom-built AFM tip/stage assembly 501 comprising an AFM tip array 502. The AFM tip array 502 is configured to increase the efficiency for nano-patterning the objects. For example, using a single tip, the process could be very slow, while using an array could speed up the process. Given that an array has 10 tips, it can scatch 10 nano-patterns simultaneously. The AFM tip array 502 is affixed to a manual Z-positioner 503 that may be also configured with a side imaging camera 504. The camera 504 and the Z-positioner 503 cooperate to provide a coarse distance control between the AFM tips and the sample. The Z-positioner 503 may be a manual positioner with, for example, a range of about 40~50 mm, and a resolution of about 1 μm, and the range/resolution of Z-axis in the nanopositioner 400 is, for example, 100 μm/0.1 nm. So the Z-positioner 503 and the nanopositioner 400 form a coarse-fine Z-axis distance adjustment. The camera 504 provides a feedback signal (the view of distance between AFM tips and the samples or objects) for the operator to control.

During a nano-patterning process, the Z-$\theta_X$-$\theta_Y$ stage 505 controls both the Z-axis position of the tip array and the parallelism between the array and the sample, while the X-Y stage 506 performs the actual X-Y scanning and patterning. For example, when a 2D (X-Y) parallel nano-patterning process is implemented with the nanopositioner 400, the scanning (locating where we should draw the patterns) and patterning (scratching a 2D pattern onto the substrate) are planar and based on the X-Y stage. While the Z-θX-θY stage 505 ensures the sample stay in the plane parallel to the array. The nano-manufacturing station 500 further comprises X-Y stage drivers 205 and 206, each of which is configured to move the respective beam in at least one direction.

When the object's area to be patterned is smaller than the default range of the X-Y stage, it begins to tune the stiffness of beams of the X-Y stage (stiffness-tuning). As shown in FIG. 2 discussed above, the natural frequency of the X-Y stage can be easily increased by a factor of 2 to achieve a higher patterning speed and the better dynamic characteristics.

Figure 7:
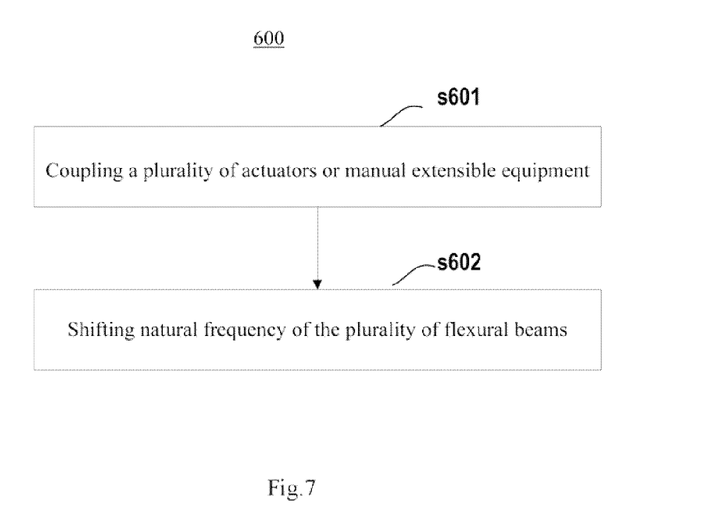
FIG. 7 is a block diagram illustrating a method for dynamic-tuning for a compliant apparatus according to an exemplary embodiment of the present application.

Hereinafter, a method 600 for dynamic-tuning process for a compliant apparatus will be discussed. The compliant apparatus may comprise a stage for supporting the objects to be nano-manufactured and the stage may comprise at least one flexural beam. As shown in FIG. 7, in step s601, a plurality of actuators or manual extensible equipment are coupled to a plurality of flexural beams of the stage, and in step s602, the actuators or manual extensible equipment are configured to generate appropriate axial loads in the plurality of the flexural beams, so as to shift a natural frequency of the plurality of flexural beams to allow trade-offs between the natural frequency and a stroke of nano-manufacturing for objects to be manufactured by the apparatus.

In the instance where the additional beam is needed, the method may further comprise a step of arranging the actuator on at least one additional beam, and configuring the actuator to generate and apply axial loads onto the additional beam. And then, the method may further comprise a step of transmitting the applied axial loads to the flexural beam such that a natural frequency of the flexural beam is shifted in response to the transmitted axial loads, allowing trade-offs between the natural frequency and the stroke of the stage for nano-manufacturing the objects.

As discussed in the above, the natural frequency of a simply supported beam with axial force N may be described by rule of Equation (1). Therefore, a trade-off between the speed (natural frequency) and the range (stroke) of a flexural apparatus may be allowed by shifting the natural frequency of the flexural beam through axial loads generated by the actuators or manual extensible equipment coupled to the flexural beam according to the "stress-stiffening effect".

In the present application, the dynamic-tuning effect is achieved by exploiting the "stress-stiffening effect", i.e. the stiffness of a beam increases when it experiences tensile loads in the axial direction. The natural frequency of a simply supported beam with axial force N can be described by rule of Equation (1).

Also, through an intelligent control, this method may actively adjust the dynamic properties, e.g. the natural frequency and the mode shapes, of a compliant apparatus to enable real-time dynamic-tuning (or natural frequency shifting).

While the foregoing is directed to embodiments of the present application, other and further embodiments of the application may be devised without departing from the basic scope thereof.

What is claimed is:

1. A compliant apparatus for nano-manufacture, comprising a stage for supporting the objects to be nano-manufactured, wherein the stage comprises at least one flexural beam and at least one actuator coupled to the flexural beam, and
    wherein the actuator is configured to generate and apply axial loads onto the flexural beam in a longitudinal direction thereof, such that a natural frequency of the flexural beam is shifted in response to the generated axial loads to allow trade-offs between the natural frequency and a stroke of the stage for nano-manufacturing the objects, and
    wherein the axial loads are generated according to a required stroke of the compliant apparatus and the natural frequency is changed in response to the generated loads.

2. The compliant apparatus of claim 1, wherein the stage further comprises:
    at least one additional beam in which the actuator is arranged,
    wherein the actuator is configured to generate and apply axial loads onto the additional beam, and
    wherein the additional beam is attached to the flexural beam such that the additional beam transmits the applied axial loads to the flexural beam, and a natural frequency of the flexural beam is shifted in response to the transmitted axial loads, allowing trade-offs between the natural frequency and the stroke of the stage for nano-manufacturing the objects.

3. The compliant apparatus of claim 1, wherein the natural frequency of the flexural beam applied with the generated axial load is determined based on a stress-stiffening effect of the flexural beam.

4. The compliant apparatus of claim 1, wherein the actuator is configured to generate the axial loads according to a required stroke of the nano-manufacturing for the objects so as to change the natural frequency.

5. The compliant apparatus of claim 1, wherein the at least one flexural beam comprises a first beam and a second beam, and the at least one actuator comprises a first actuator and a second actuator,
    wherein the first actuator is arranged on the first beam; and the second actuator is arranged on the second beam;
    wherein the first actuator generates and applies an axial load to the first beam to allow trade-offs between the natural frequency and the stroke of the stage in an axial direction of the first beam; and
    the second actuator generates and applies an axial load to the second beam to allow trade-offs between the natural frequency and the stroke of the stage in an axial direction of the second beam,
    wherein the axial directions of the first and second beams intersect each other.

6. The compliant apparatus of claim 1, wherein the at least one flexural beam comprises a first beam, a second beam and a third beam, and the at least one actuator comprises a first actuator, a second actuator and a third actuator, wherein the first actuator is arranged on the first beam; the second actuator is arranged on the second beam; and the third actuator is arranged on the third beam;

wherein the first actuator generates and applies an axial load to the first beam to allow trade-offs between the natural frequency and the stroke of the stage in an axial direction of the first beam;

the second actuator generates and applies an axial load to the second beam to allow trade-offs between the natural frequency and the stroke of the stage in an axial direction of the second beam; and the third actuator generates and applies an axial load to the third beam to allow trade-offs between the natural frequency and the stroke of the stage in an axial direction of the third beam, wherein the axial directions of the first, second and the third beams intersect each other.

7. The compliant apparatus of claim 2, wherein the at least one additional beam comprises a first thick beam and a second thick beam, the at least one flexural beam comprises a first flexural beam and a second flexural beam, and the least one actuator comprises a first actuator and a second actuator, wherein the first actuator is arranged on the first thick beam and the second actuator is arranged on the second thick beam;

wherein the first thick beam and the first flexural beam form a first compliant assembly, and the second thick beam and the second flexural beam form a second compliant assembly; and wherein the first actuator generates and applies an axial load to the first compliant assembly to allow trade-offs between the natural frequency of the first compliant assembly and the stroke of the stage in an axial direction of the first compliant assembly; and the second actuator generates and applies an axial load to the second compliant assembly to allow trade-offs between the natural frequency of the second compliant assembly and the stroke of the stage in an axial direction of the second compliant assembly, wherein the axial directions of the first and second compliant assemblies intersect each other.

8. The compliant apparatus of claim 2, wherein the at least one additional beam comprises a first thick beam, a second thick beam and a third thick beam, the at least one flexural beam comprises a first flexural beam, a second flexural beam and a third flexural beam, and the least one actuator comprises a first actuator, a second actuator and a third actuator, wherein the first actuator is arranged on the first thick beam, the second actuator is arranged on the second thick beam, and the third actuator is arranged on the third thick beam;

wherein the first thick beam and the first flexural beam form a first compliant assembly, the second thick beam and the second flexural beam form a second compliant assembly, and the third thick beam and the third flexural beam form a third compliant assembly; and wherein the first actuator generates and applies an axial load to the first compliant assembly to allow trade-offs between the natural frequency of the first compliant assembly and the stroke of the stage in an axial direction of the first compliant assembly; the second actuator generates and applies an axial load to the second compliant assembly to allow trade-offs between the natural frequency of the second compliant assembly and the stroke of the stage in an axial direction of the second compliant assembly; and the third actuator generates and applies an axial load to the third compliant assembly to allow trade-offs between the natural frequency of the third compliant assembly and the stroke of the stage e in an axial direction of the third compliant assembly; and wherein the axial directions of the first, the second and the third compliant assemblies intersect each other.

9. The compliant apparatus of claim 1, further comprising:

at least one driver configured to move the stage in at least one direction.

10. The compliant apparatus of claim 1, wherein the actuator comprises piezoelectric actuator or manual extensible equipment.

11. A station for nano-manufacturing objects, comprising:

at least one compliant apparatus configured with:

a stage for supporting the objects to be nano-manufactured, wherein the stage comprises at least one flexural beam and at least one actuator coupled to the flexural beam; and wherein the actuator is configured to generate and apply axial loads onto the flexural beam in a longitudinal direction of the flexural beam, such that a natural frequency of the flexural beam is shifted in response to the generated axial loads to allow trade-offs between the natural frequency and a stroke of the stage for nano-manufacturing the objects;

at least one driver configured to drive the compliant apparatus in at least one direction;

an AFM tip/stage assembly arranged for nano-scratching the objects; and a probe array arranged for electro-machining the objects at a nano scale, wherein the axial loads are generated according to a required stroke of the compliant apparatus and the natural frequency is changed in response to the generated loads.

12. A method for dynamically tuning a compliant apparatus, wherein the compliant apparatus comprises a stage for supporting the objects to be nano-manufactured and the stage comprises at least one flexural beam; the method comprises:

coupling at least one actuator to the flexural beam; and configuring the actuator to generate and apply axial loads onto the flexural beam in a longitudinal direction thereof, such that a natural frequency of the flexural beam is shifted in response to the generated axial loads to allow trade-offs between the natural frequency and a stroke of the stage for nano-manufacturing the objects, wherein the axial loads are generated according to a required stroke of the compliant apparatus and the natural frequency is changed in response to the generated loads.

* * * * *